Figure 1:
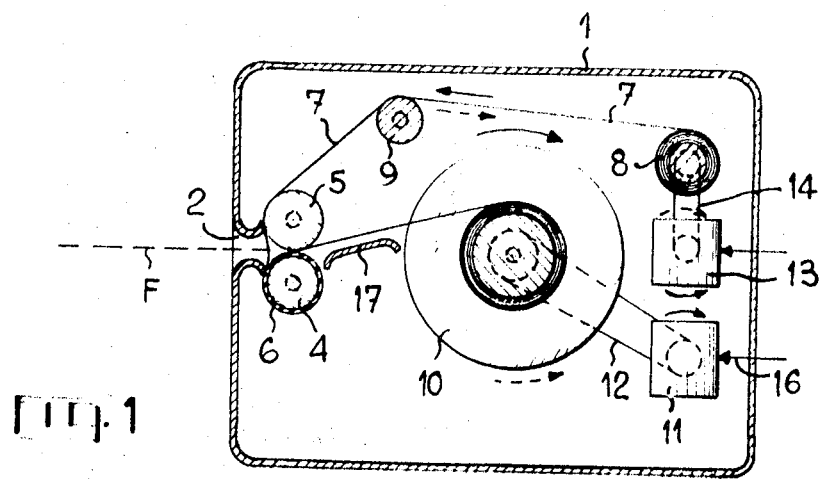

United States Patent [19]
Hommerin

[11] 3,743,200
[45] July 3, 1973

[54] MAGAZINE FOR BARE FILM SHEETS FOR USE IN X-RAY FILM HANDLING APPARATUS

[75] Inventor: Michel Hommerin, Paris, France

[73] Assignee: Compagnie Generale De Radiologie, Paris, France

[22] Filed: July 29, 1971

[21] Appl. No.: 167,262

[30] Foreign Application Priority Data
Aug. 4, 1970  France .............................. 7028679
Apr. 30, 1971  France .............................. 7115609

[52] U.S. Cl. ......... 242/67.3 R, 242/71.7, 242/75.51, 355/64
[51] Int. Cl. ......................................... B65h 17/06
[58] Field of Search ................. 242/67.3 R, 67.1 R, 242/71.7, 75.51, 179; 95/13; 318/6, 7; 355/64

[56] References Cited
UNITED STATES PATENTS
3,191,882  6/1965  Riedel ........................... 242/67.3 R
3,264,962  8/1966  Dieffenbach .......................... 95/13
2,981,492  4/1961  Simjian .......................... 242/67.3 R
1,957,889  5/1934  Hopkins ............................... 355/64
2,968,451  1/1961  Schneider ........................ 242/75.51

Primary Examiner—George F. Mautz
Assistant Examiner—Edward J. McCarthy
Attorney—Cushman, Darby & Cushman

[57] ABSTRACT

Magazine for storing bare film sheets, for use in X-ray film handling apparatus, comprising a light-tight housing and a slot for introducing or ejecting said sheets, further including within said housing: a motor-driven central storage roller; a motor-driven feed roller, and a plastic flexible band wound respectively around said two rollers. The film sheet introduced in the slot is wound on the central roller and stored between two faces of the band fed from the feed roller. For ejection the feed roller is driven to unwind the band from the central roller and carry the sheet towards the slot.

10 Claims, 7 Drawing Figures

Patented July 3, 1973

3,743,200

4 Sheets-Sheet 2

MAGAZINE FOR BARE FILM SHEETS FOR USE IN X-RAY FILM HANDLING APPARATUS

The present invention relates to magazines for storing bare film precut into sheets, either prior to or after exposure and more particularly to magazines for use with radiographic apparatus.

In some known X-ray film handling apparatus for bare film, currently magazines are being used in which the exposed negatives are stored in a stack in a light-proof housing. In order to extract the negatives from this kind of magazine, it is necessary to open the magazine in a room illuminated by non-actinic light, and to handle them manually in order to insert them one by one into an appropriate developer system. On the other hand, the capacity of this kind of magazine may be limited and stacking inside it may sometimes be defective and give rise to damage to the exposed negatives.

In other known X-ray film handling apparatus of this type, the precut X-ray film, either bare or contained in a suitable packing which is opaque to visible light and transparent to X-rays, is respectively stacked, prior to and after exposure, in two separate stacks of parallel sheets having the same format. The transfer of each of the sheets from the magazine in which the unexposed film is stored, to the exposure location and from the latter to the magazine in which the exposed negatives are stored, is effected by a pair of motor-driven belts located in proximity of the respective edges of the film. The film or pack, and the belts, are respectively provided with openings and projections, or vice versa, which engage with one another as the belts move and thus transfer the film.

When using a bare film, the magazines for the unexposed and exposed films are generally made up of light-proof boxes or cassettes and the operations of loading and unloading the film have to be carried out manually in a room illuminated by non actinic light. The same applies to the extraction of the exposed negatives from the aforementioned packs, prior to their insertion one by one into a suitable developer system. In addition, the film or the pack containing it, has to be equipped with elements which will engage with the corresponding belt elements, rendering the negative more expensive.

The device in accordance with the invention enables these drawbacks to be overcome. In the latter it is possible to load the magazine, which has its own motor, with precut unexposed film coming, for example, from a device for cutting spool-wound film into sheets, and to unload it, when it is filled with exposed negatives, into a matching developer system without employing any manual handling. An X-ray diagnostic apparatus can be equipped with two identical and interchangeable feeder and receiver magazines according to the invention that is to say that a feeder magazine feeding out unexposed film and which has just become empty, can be used to replace a receiver magazine for exposed film, which has just become filled.

In a magazine in accordance with the invention, in other words, the negatives are stored on a roller or spool between two sheets of flexible material which protect them.

Another advantage of a magazine in accordance with the invention consists in the fact that it enables the thus stored negatives to be transferred one by one to the automatic film-processing unit, this transfer function being effected very readily by presenting the slot of the magazine opposite the input slot of said unit, and by operating an electric motor contained in the magazine. It is also possible to adapt the walls of these devices in order to make it possible to unload the magazine in accordance with the invention in daylight.

According to the invention, there is provided in an X-ray film handling apparatus, a magazine for storing bare film precut into sheets used for storing exposed negatives and/or for supplying unexposed film, said magazine comprising a light-tight housing provided with an elongated narrow slot for the introduction of said film sheets therein and their ejection therefrom, one by one, and including within said housing:

flexible means made up from a band of plastic material; a motor-driven supply spool for containing a supply of said flexible means, whose one extremity is fixed thereto;

a motor-driven storage spool for storing said film sheets thereupon between two faces of said flexible means, whose other extremity is fixed to said storage spool substantially located at the center of said housing, said supply and storage spools having respective shafts parallel to said slot;

a pair of contiguous cylindrical rollers parallel to and located close to said slot for light-tightly shielding said magazine, said flexible means, between said supply and said storage spool, passing around one roller of said pair and between both of them, whereby to guide said film sheets to be stored from said slot towards said storage spool and/or those to be ejected from said storage spool towards said slot; electrical motor means for respectively driving said supply and storage spools;

electrical connector means mounted on said housing for delivering electrical supply voltages to and signals from said magazine, said connector means having a plurality of contacts;

and rotary signalling means having a shaft coupled to that of one of said spools and fed by one of said supply voltages for delivering a first signal on one of said contacts when said storage spool is empty and a second signal on another one of said contacts when said storage spool is full.

Figure 7:
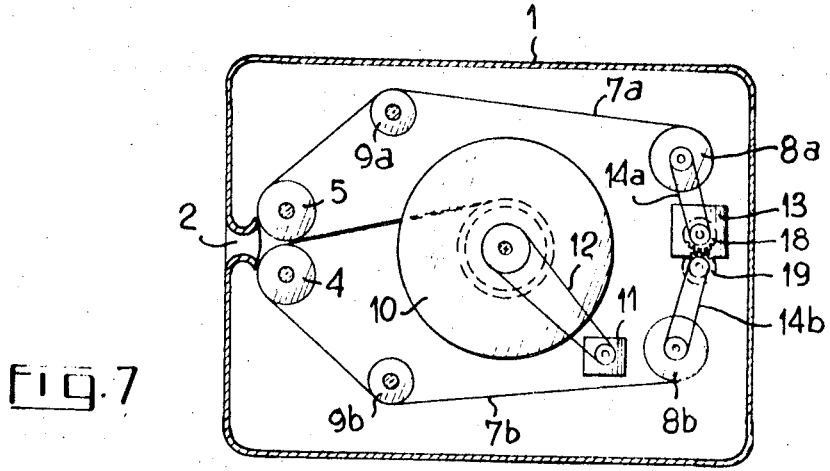
Figure 2:
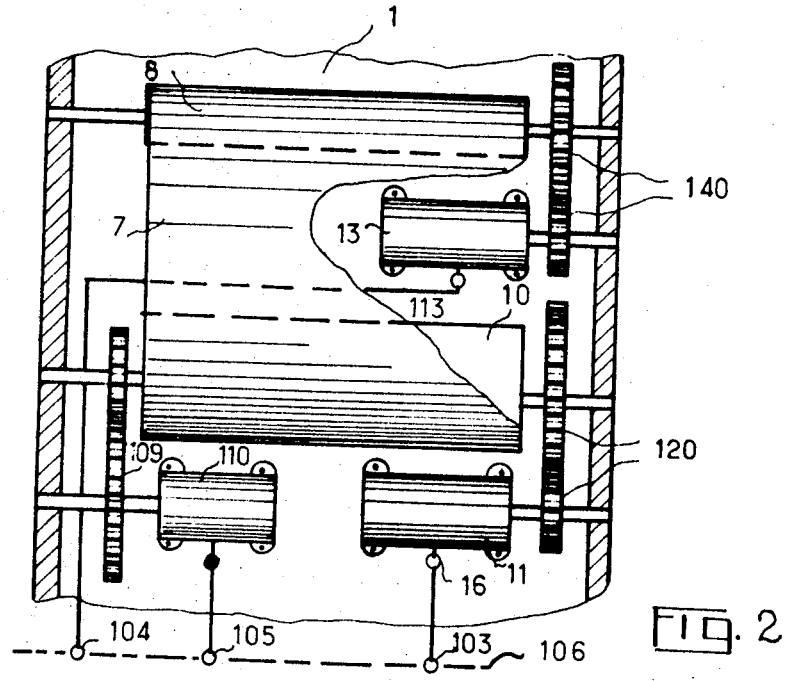
Figure 3:
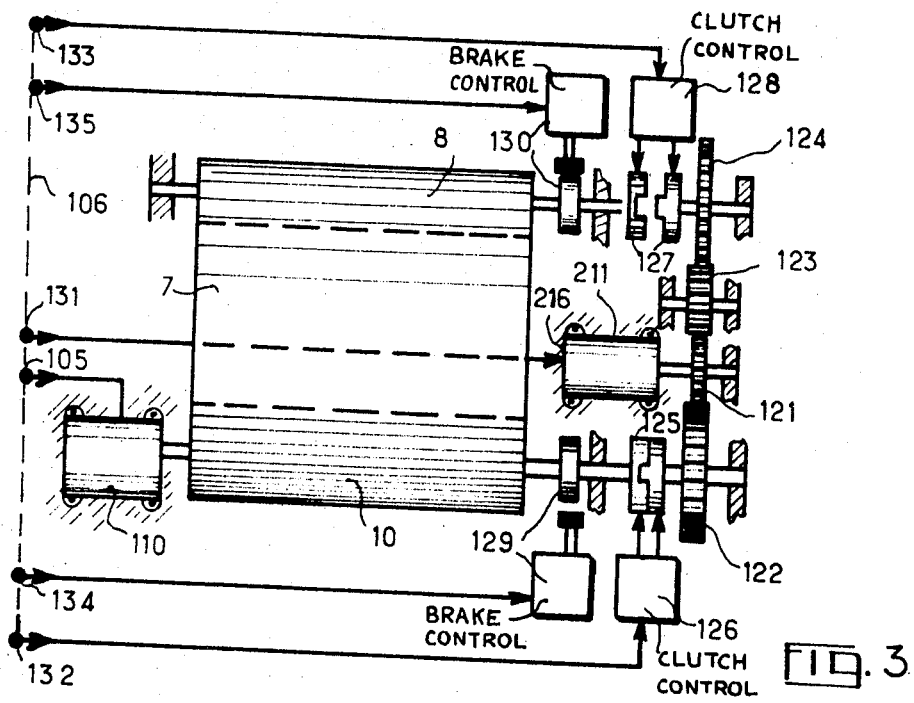
Figure 4:
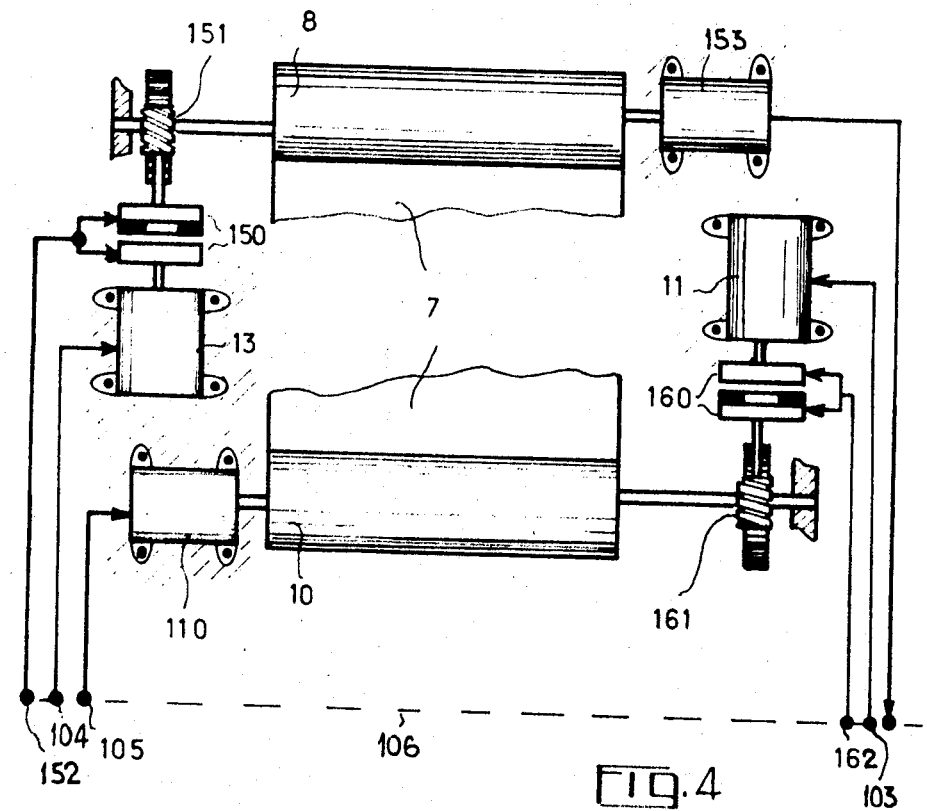
Figure 6:
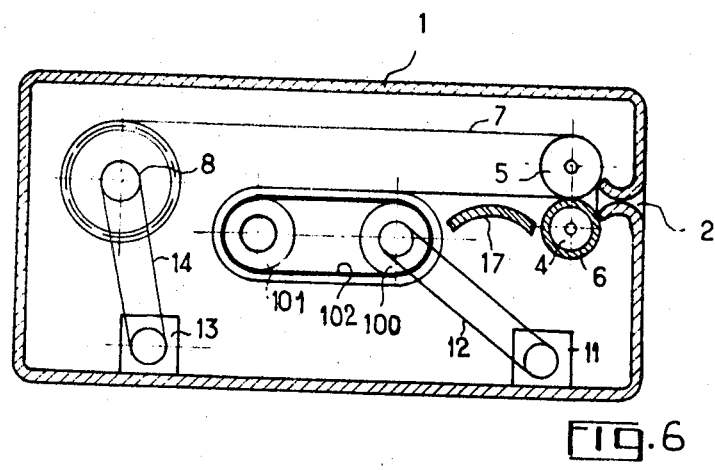
Figure 5:
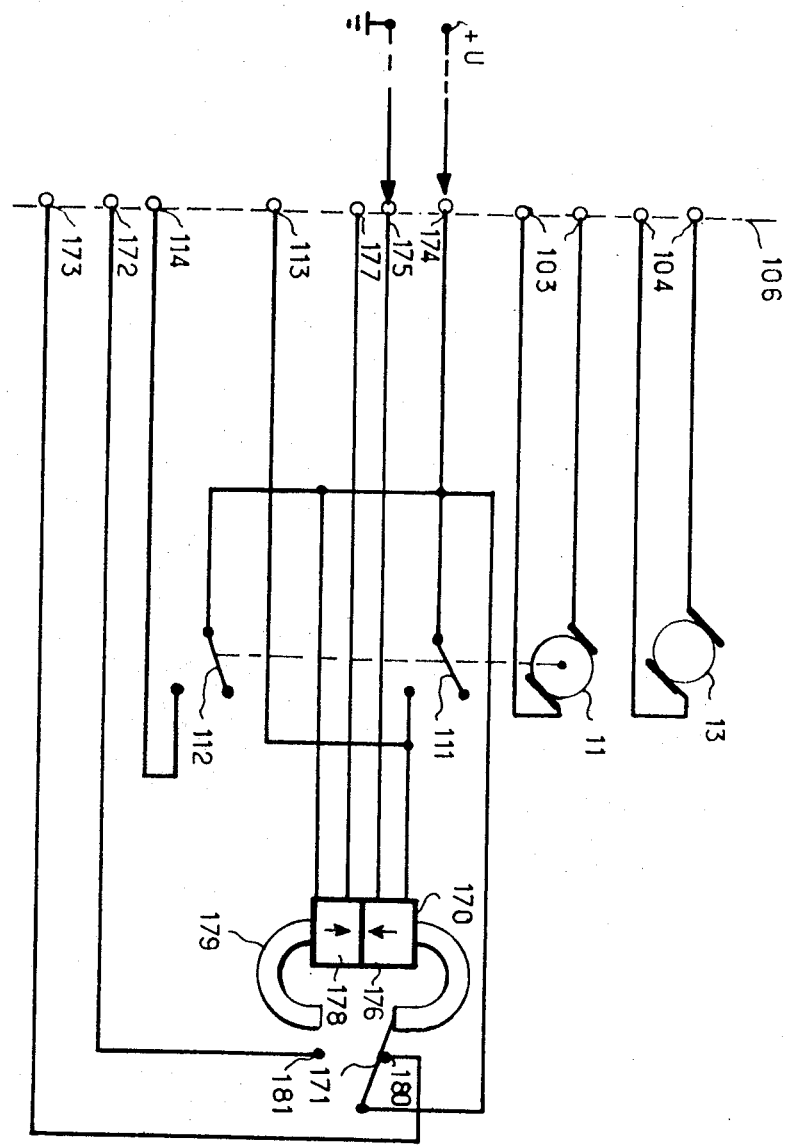

In order that the invention may more readily be understood and other features and advantages thereof become apparent some embodiments of same will now be described, by way of example, with reference to the accompanying drawings, wherein;

FIG. 1 is a cross-sectional view of an embodiment of the magazine in accordance with the invention;

FIGS. 2, 3 and 4 schematically illustrate the variant embodiments of the drive arrangement for the magazine according to the invention;

FIG. 5 schematically illustrates the electrical circuit located inside the magazine illustrated in FIG. 2;

FIGS. 6 and 7 illustrate other variant embodiments of the magazine according to the invention.

In FIG. 1, the magazine comprises a parallelepipedic light-proof housing 1 with a slot 2 for the introduction of the film F.

The slot 2 through which the film is received is closed off by means of two cylindrical rollers 4 and 5, the first of which 4 has a supple surface 6. The second roller 5 also does duty as the return roller for a band 7 of plastic material, for example polyethyleneterephthalate, which is preferably metallized and has a width slightly larger than that of the film F. The reserve of band 7 is carried on the cylindrical spool or roller 8 and is fed across a return roller 9 and the roller 5 to a central cylindrical spool or roller 10 driven by a first motor 11 through a belt 12 for example. The cylindrical spool or roller 8 carrying the reserve of band 7, is likewise driven by a second motor 13 and a belt 14. A deflector 17 is arranged between the rollers 4, 5 and the roller 10, in order to guide the film F.

Operation of the magazine hereinbefore described, is as follows:

when the film sheet, exposed or unexposed, is fed to the slot 2 of the housing, and when it comes into contact with the rollers 4 and 5, the first motor 11 is started by a voltage applied to its input 16, driving the central spool 10 in the clockwise direction. The band 7 is wound around the spool 10 and the film F, picked up between said band 7 and the flexible surface 6 of the roller 4, is likewise driven towards the spool 10, guided by the deflector 17 as its goes. When the film F reaches the spool 10, it is taken between two faces of the band 7 and subsequently wound up therewith. When the film is fully wound onto the spool 10, the first motor 11 is halted until another film sheet arrives for storage. The starting and stopping of the motor 11 can be controlled by a photoelectric cell responsive to non-actinic radiation (not shown) located for example at the magazine entry and connected to a magazine control circuit; the starting of the motor 11 is controlled by the cutting of the light beam between the emitter and the cell, and the motor is stopped by the re-establishment of this light beam, the timing being such that the film has had an opportunity to penetrate sufficiently far into the interior of the magazine.

During the winding of the film F and the band 7 onto the spool 10, the spool 8 pays off the band 7. If the reduction gear of the motor 13 is reversible, the motor 13 can be preferably utilized here both as a tachogenerator and as a brake, that is to say that the winding of its rotor is connected to an external circuit (outside the magazine) containing a resistor through which the current generated by its rotation flows. Across the terminals of this resistor a voltage is picked up which is proportional to the speed of rotation of the motor. This voltage is used to control the speed of the motor 11. If the braking needed to maintain the band 7 under tension is insufficient, the motor 13 can be used purely as a brake by supplying its rotor with a low voltage whose polarity is such that the motor 13 opposes the unwinding of the band 7 from spool 8.

The controlling of a constant speed in the motor 11 during the storage of the film, will be effected for example by means of the back-e.m.f. of the motor 13 itself or again with the help of a supplementary tachogenerator coupled to either of the motors 11 or 13.

When it is desired to eject or feed out the film sheets stored on the roller 10, the second motor 13 is started driving the roller 8 in the clock-wise direction. The band 7 is unreeled from the roller 10 and wound on to the roller 8. The exposed negatives are unreeled from the roller 10 and guided between the band 7 and the deflector 17 across the space between rollers 4 and 5 to the slot 2, and ejected one by one until the magazine is completely empty.

During ejection of the sheets stored in the magazine, the first motor 11 coupled to the roller 10 acts as a brake in the same way as the second motor 13 does during the storage phase.

FIGS. 2, 3 and 4 schematically illustrate the variant embodiments of the drive system for the magazine of FIG. 1.

In FIG. 2, the central spool 10 is driven by means of a pair of gears 120 acting as a reversible reduction gear, by the first motor 11 which is supplied through its input 16. The reserve spool 8 is in turn driven by the second motor 13 by means of another reversible reduction gear 140, the motor 13 being supplied through its input 113. Each of the inputs 16 and 113 here represented by single terminals, corresponds to two terminals which are connected to the field winding of the motor and respectively taken to the terminals 103 and 104 of a connector 106 arranged in the wall 1 of the magazine in order to provide connection between the latter and the X-ray apparatus by means of a corresponding connector (not shown). The shaft of the spool 10 in turn, by means of gears 109 for example, drives a signalling device 110 known as a coder, this being a known kind of device which, at its output 105, signals the state of the magazine; the device will be described in more detail hereinafter.

In FIG. 3, another embodiment of the drive system for the magazine has been shown, this time using a single motor 211 which drives one or the other of the spools 8 or 10. The drive system incorporates a gear 121 fixed to the shaft of the motor 211 and a set of gears 122 and 123 and 124 driven by said first mentioned gear, one of which, 123, is used to reverse the direction of rotation in which the spool 8 is driven. The shafts of the spools 10 and 8 are respectively coupled to the gears 122 and 124 through the medium of electromagnetic clutches 125 and 127 controlled by control devices 126 and 128, said shafts being furthermore respectively fitted with electromagnetic braking devices 129 and 130. This braking function can be carried out by the clutches 125 and 127 if their torques are electrically controllable.

Since the motor 211 always rotates in the same direction, it is possible to use a non-reversible reduction gear unit. The motor 211 controls the rotation of that of the rollers (called the downstream roller) which winds up the band 7, coupling being effected with the help of the corresponding clutch. The upstream roller which unreels the band 7, is not driven but is braked to ensure that the band tension is maintained. The motor 211, the clutch control devices 126 and 128 and the brakes 129 and 130 are respectively controlled by voltages applied to the inputs 131 to 135, the coder 110 feeding the output 105.

In FIG. 4, one of the preferred embodiments of the magazine drive system has been shown. Here, each of the spools 8 and 10 is driven by a respective motor 13 and 11, by means of two electrical couplers (clutches) 150 and 160 and non-reversible reduction gears 151 and 161 symbolically represented by a worm gear. The shaft of the central spool 10 is, furthermore, coupled to a coder device 102 and the shaft of the reserve spool 8 to a tachogenerator 153 enabling one of the motors 11 or 13 to be controlled in order to accelerate the movement of the film. It will be observed here that it is possible to associate the tachogenerator with the other spool 10, or to utilize two of them.

During the operation of this variant embodiment of the magazine in accordance with the invention, the two motors 11 and 13 are supplied simultaneously or, and this preferentially, permanently rotate in the direction of transfer to the band. The coupling of the shafts of the motors 11 and 13 to the shafts of the spools 8 and 10 is effected by respective couplers 160 and 150 which can advantageously take the form of friction clutches controlled electrically by voltages applied to their respective control inputs, that is to say the terminals 162 and 152 of the connector 106.

The tension in the band 7 is maintained by the fact that, on the one hand, the downstream coupler driving the roller to which the band 7 is wound, is operated very slightly in advance of the upstream coupler which controls the unreeling of the band with the help of the upstream motor and, on the other hand, by the fact that the downstream motor is supplied with a voltage such that it gives the downstream roller a no-load peripheral velocity which is higher than that of the upstream roller, the said velocity in the latter roller being regulated by the tachogenerator 153 which controls the voltage supplied to the upstream motor.

However, it is the upstream motor, whose speed is regulated, which determines the speed of ejection or storage of the film and since the downstream motor has a higher speed than the upstream motor, it enables the band 7 to be tensioned as it moves. The value of the voltage supplied to the upstream coupler during the displacement of the band, is not critical and is generally chosen to be equal to the voltage supplied to the downstream coupler under the same conditions. When it is desired to halt the movement of the band, first of all supply to the upstream coupler is cut off and shortly afterwards, the supply to the downstream coupler, this in order to maintain the band 7 under tension. If it is desired to take a rapid sequence of X-ray photographs, i.e. a burst of photographs, preferably only the upstream coupler will be disengaged, the downstream coupler remaining live in order to prevent the occurrence of the delay which is due to the time taken for the current to build up in it.

The control of this kind of magazine is effected by control circuits designed in known fashion using electronic elements (feedback amplifiers, delay circuits, etc) and electromechanical or electromagnetic elements (relays, inverters, contactors, etc) in order to control the upstream motor, the reversals of polarity of the motor supplies and the control of the couplers with the requisite delays. These control circuits, part of which at least is disposed externally on the magazine, are connected to the latter by the connector 106.

FIG. 5 illustrates highly schematically part of the circuit contained inside a magazine in accordance with the invention. In this figure, the first 11 and second 13 motors are respectively connected to the pairs of pins 103 and 104. The coder device 110 of FIGS. 3 to 5 here comprises two contacts breakers 111 and 112 respectively signalling the terminal positions of said device, that is to say the make contact of the first 111 signals that the magazine is empty and that of the second 112 signals that the magazine is full. In addition, the coder 110 signals the angular position of its shaft, which is driven by that of the central spool 10, for example, in order to indicate the number of films which have been fed out or stored. This angular position can be signalled either by an analogue voltage (spiral-wound potentiometer) or by a digital number (numerical angle coder), for example, which is processed in a known computer device which may form part of the control panel of the X-ray diagnostic apparatus fitted with magazines in accordance with the invention.

The signalling by the contact breakers 111 and 112 takes the form of voltages appearing respectively on the pins 113 and 114 of the connector 106 of the magazine, when the contacts are closed. To this end, a voltage U is permanently applied to the pin 174.

The magazine furthermore comprises a differential polarized relay 170 that is to say a relay which has a magnetic latching facility in the form of a permanent magnet 179 acting as a bistable element with two stable positions. The relay 170 comprises, for example, two windings supplied in opposite directions, the first 176 of which establishes a connection between the moving contact 171 and the first contact 180, and the second 178 a connection between the moving contact 171 and the second fixed contact 181, the moving contact 171 being supplied with the voltage U from the pin 174 of the connector. The relay 170, which must remain in the position which it occupies when neither of its windings 176 and 178 is supplied, signals the quality of film contained in the magazine in order to determine the direction of movement of the band and, consequently, to determine which of the motors 11 or 13 is to be supplied. This signalling takes the form of the voltage U on one of the pins 172 and 173 of the connector 106, which are connected respectively to the second and to the first fixed contacts, the voltage U of the first pin 172 indicating that the film contained in the magazine is unexposed and its appearance on the second 173 signalling that the magazine is empty or that it contains exposed film.

The pulling up of the relay 170, to signal unexposed film, is controlled by the unexposed film loading device (not shown), the pin 177 of the connector being connected to the negative terminal of a supply source producing a voltage U, its positive terminal being connected to the pin 174 and the pin 175 being left unconnected. Pulling up of the said relay in the opposite direction (empty or exposed) is controlled by the contact breaker 111 of the coder 110 since in each of the compartments of the X-ray film handling apparatus adapted to receive the magazines according to the invention respectively used for storing the unexposed film supply and the exposed negatives, the pins 174 and 175 are respectively connected to the terminals of a supply source producing a voltage U.

It is worthy of note here, that it is equally possible to control the relay 170 through a single winding, by using voltages of opposite polarity or by using a polarized relay with a single winding.

When a magazine, such as shown in FIGS. 1, 2 and 5, is used for storing exposed negatives, it is introduced while empty in a corresponding lodging within the radiographic apparatus which comprises a multiple connector allowing to establish connections with connector 106 of the magazine.

This connector then receives on its pin 174 a positive voltage U, the pin 175 being earthed. The contact of the coder 110 of the magazine being closed, since said magazine is empty, the voltage U applied to the winding 176 of the relay 170 causes the latter to pull up so that the voltage U appears on the pin 173 of the connector 106, which is therefrom applied to the control circuit of the apparatus.

If such a magazine is also used to supply unexposed film sheets to the radiographic apparatus, it is firstly, while empty, taken for example to a darkroom where it is loaded with unexposed film either manually by introducing precut films one by one through the slot 2 or automatically using an associated spool film feed and cutting (guillotining) system, this system, for example, being similar to the loading section of the X-ray film handling apparatus described in copending U.S. application Ser. No. 162,568 filed July 14, 1971.

It will be observed here that in this latter case it is possible, by adaptation of the walls of the magazine and the associated system, to make the arrangement light-proof so that loading can be carried out in daylight. It is also a simple matter to produce a common control circuit for the associated system and the magazine, so that the loading can be carried out automatically by synchronizing the various controls of the motors used, and so that the system halts automatically when the magazine is full (the voltage U appearing on the pin 114 of the connector 106).

During the filling of the magazine with unexposed film, the terminal 174 of the connector 106 receives a positive voltage U, whilst the terminal 177 is earthed. Said voltage U supplies the winding 178 of the relay 170 and causes it to pull up, connecting the moving contact 171 with the fixed contact 180 in order to produce the signal on the pin 172 that the magazine contains unexposed film.

When the magazine is loaded, it is inserted into an empty compartment of the radiographic apparatus and its internal circuit, shown in FIG. 5, is connected to the control circuit thereof.

It is to be noted here that the two identical magazines used in one apparatus, one for unexposed film supply the other for storing exposed negative are interchangeable and even reversible. As a matter of fact, the magazine stores information concerning the quantity and the quality of the film contained therein by means of coder 110 and bistable relay 170.

FIG. 6 illustrates a variant embodiment of the magazine in which the central spool 10 is replaced by two cylindrical spools 100 and 101 which are parallel and identical to one another (they have smaller diameters than the spool 10), and are spaced a predetermined distance apart.

In this case, the surface to which one end of the band 7 is attached is constituted by a belt 102 tensioned between the two spools 100 and 101, one of which spools is driven by the motor 11. Said belt 102 will preferably be constituted by the band 7 itself whose ends are stuck together.

In FIG. 7 another variant embodiment of the device in accordance with the invention has been shown, this comprising two bands 7a and 7b the reserve of which is carried on two rollers 8a and 8b. The bands 7a and 7b pass respectively over two return rollers 9a and 9b in front of the slot 2 in the housing 1, and are engaged between the rollers 4 and 5 which are disposed in proximity of said slot 2. From there, the parallel bands pass to the roller 10 which carries their ends.

Here, the film sheets introduced into the magazine are taken between the two bands 7a and 7b and stored on the roller 10. The two rollers 8a and 8b are driven by a second single motor 13 and are rotated in mutually opposite directions by means of a set of two gears 18 and 19 fixed to two pulleys respectively carrying two belts 14a and 14b.

It is to be remarked, that the bands 7 (or 7a and 7b), can be made of a plastic material other than polyethyleneterephthalate.

It goes without saying that the motor-driven magazines described hereinbefore and constituting on the one hand the reserve of unexposed film and on the other the storage magazine, can equally well be utilized in an X-ray apparatus for example of the kind described in the aforementioned copending patent application.

In this case, the loading section comprising a location for spool-wound film, the feed rollers and the cutter, can be replaced by a motor-driven magazine identical to that utilized in the storage section of the selector.

Of course, the invention is not limited to the embodiments described and shown which were given solely by way of example.

What is claimed is:

1. In an X-ray film handling apparatus, a magazine for storing bare film precut into sheets used for storing exposed negatives and/or for supplying unexposed film, said magazine comprising a light-tight housing provided with an elongated narrow slot for the introduction of said film sheets therein and their ejection therefrom, one by one, and including within said housing:
flexible means made up from a band of plastic material; a motor-driven supply spool for containing a supply of said flexible means, whose one extremity is fixed thereto; a motor-driven storage spool for storing said film sheets thereupon between two faces of said flexible means, whose other extremity is fixed to said storage spool substantially located at the center of said housing, said supply and storage spools having respective shafts parallel to said slot; a pair of contiguous cylindrical rollers parallel to and located close to said slot for light-tightly shielding said magazine, said flexible means, between said supply and said storage spool, passing around one roller of said pair and between both of them, whereby to guide said film sheets to be stored from said slot towards said storage spool and/or those to be ejected from said storage spool towards said slot;
electrical motor means for respectively driving said supply and storage spools;
electrical connector means mounted on said housing for delivering electrical supply voltages to and signals from said magazine, said connector means having a plurality of contacts; and rotary signalling means having a shaft coupled to that of one of said spools and fed by one of said supply voltages for delivering a first signal on one of said contacts when said storage spool is empty and a second signal on another one of said contacts when said storage spool is full.

2. Magazine as claimed in claim 1, wherein said rotary signalling means further comprises means for delivering to a further contact of said connecting means a third signal function of the angular position of its shaft, whereby to indicate the number of said film sheets retained on said storage spool.

3. Magazine as claimed in claim 1, adapted to operate alternately as a supply of unexposed film and as means for storing exposed negatives, further including within said housing electrically operated bistable switching means for indicating the quality of the film contained therein, said switching means being made up by a polarized relay with magnetic latching so as to remain in any of its stable states without being fed by a control voltage; said relay being set into its first state by means of a control voltage applied to a fourth contact of said connecting means while being charged with unexposed film for delivering a voltage signalling the presence thereof to a fifth contact and reset into its second state by means of said first signal when it becomes empty.

4. Magazine as claimed in claim 1, wherein said motor means for driving said supply and said storage spools include a single motor having a shaft alternately coupled to those of said spools by means of two electrically controlled clutches, and wherein the shafts of said spools are respectively equipped with electrically operated brakes for stretching said flexible means.

5. Magazine as claimed in claim 1, wherein said motor means for driving said supply and said storage spools include a first motor coupled to the shaft of said supply spool by means of a first reduction gear and a second motor coupled to the shaft of said storage spools by means of a second reduction gear, both of said motors having rotor windings.

6. Magazine as claimed in claim 5, wherein said reduction gears are reversible, the motor driving the spool whereon said flexible means is wound being fed by a voltage, while the motor coupled to the spool wherefrom said flexible means is unwound acts as a brake in order to stretch said latter.

7. Magazine as claimed in claim 6, wherein said motor acting as a brake has its rotor loaded by a resistor, said resistor delivering a voltage drop proportional to the speed of rotation of said rotor, said voltage drop controlling the motor driving the spool whereon said flexible means is wound, whereby said motor acting as brake also acts as a tachogenerator.

8. Magazine as claimed in claim 5, wherein said reduction gears are irreversible, and wherein said shafts of said two motors are respectively coupled to said reduction gear by means of electrically controlled friction couplers.

9. Magazine as claimed in claim 1, wherein said band of plastic material is made of metallized polyethyleneterephtalate.

10. Magazine as claimed in claim 1, further including within said housing: second flexible means and a second motor driven supply spool for carrying a supply of said second flexible means, said second flexible means being wound on and unwound from said storage spool simultaneously with the first named means for holding said film sheets between the two.

* * * * *